United States Patent [19]

Rastas et al.

[11] 4,355,005

[45] Oct. 19, 1982

[54] PROCESS FOR THE TREATMENT OF A RAW MATERIAL WHICH CONTAINS OXIDE AND FERRITE OF ZINC, COPPER AND CADMIUM

[75] Inventors: Jussi K. Rastas, Pori; Pekka J. Saikkonen, Espoo; Risto J. Honkala, Vanha-Ulvila, all of Finland

[73] Assignee: Outokumpu Oy, Helsinki, Finland

[21] Appl. No.: 306,706

[22] Filed: Sep. 29, 1981

[30] Foreign Application Priority Data

Sep. 30, 1980 [FI] Finland .................................. 803098

[51] Int. Cl.³ ...................... C22B 19/00; C01G 49/06
[52] U.S. Cl. ..................................... 423/41; 423/109; 423/146; 423/150; 423/633; 75/115
[58] Field of Search ...................... 423/41, 45, 109, 36, 423/145, 146, 150, 633; 75/120, 115

[56] References Cited

U.S. PATENT DOCUMENTS

| | | | |
|---|---|---|---|
| 1,834,960 | 12/1931 | Mitchell | 75/115 |
| 3,910,784 | 10/1975 | Rastas | 75/120 |
| 3,959,437 | 5/1976 | Rastas | 423/109 |
| 3,985,857 | 10/1976 | Menendez | 423/109 |
| 4,129,454 | 12/1978 | Pavonet | 423/633 |
| 4,219,354 | 8/1980 | Rastas | 423/146 |

FOREIGN PATENT DOCUMENTS

| | | | |
|---|---|---|---|
| 851656 | 9/1970 | Canada | 75/120 |
| 977555 | 11/1975 | Canada | 423/109 |

OTHER PUBLICATIONS

Rastas et al., "Treatment of Residues in the Electrolytic Zinc Process", TMS Paper No. A73-11, (2/73), AIME, N.Y.

Lead and Zinc, vol. II, pp. 217-219, (AIME Word Symposium), AIME, N.Y., (1970).

Primary Examiner—Brian E. Hearn
Attorney, Agent, or Firm—Brooks, Haidt, Haffner & Delahunty

[57] ABSTRACT

A process for the treatment of a raw material which contains oxides and ferrites of zinc, copper and cadmium is disclosed, in which the raw material is neutral leached with a sulfuric-acid-bearing solution in order to leach the oxide without substantial dissolving of ferrite, the ferrite-bearing residue is separated, and a sulfuric-acid-bearing or ferrisulfate-bearing solution is mixed with the residue in order to leach the ferrite and to precipitate the iron as jarosite in the presence of alkali ions or ammonium ions under atmospheric conditions at 80°-105° C., the sulfuric-acid-bearing or ferrisulfate-bearing solution being added to the ferrite-bearing residue in such an amount that approximately 50-60% of the ferrite dissolves and its iron precipitates as jarosite, the solid phase is dried and heated to so high a temperature that the zinc of the solid phase is converted to zinc sulfate and its iron to hematite according to the following reaction:

(8) $3ZnFe_2O_{4(s)} + 2A[Fe_3(SO_4)_2(OH)_6]_{(s)} \rightarrow 3ZnSO_{4(s)} + A_2SO_{4(s)} + 6Fe_2O_{3(s)} + 6H_2O_{(g)}$, (A=Na, K)

and finally the thus treated solid phase is slurried in water in order to leach the sulfates and to separate them from hematite.

3 Claims, 1 Drawing Figure

LEGEND:

| | | | |
|---|---|---|---|
| RA | RETURN ACID | SE | SEPARATION OF SOLID AND SOLUTION |
| C | CALCINE | D + TCS | DRYING + THERMAL CONVERSION |
| NL | NEUTRAL LEACH | L | LEACH |
| 1/2 x CS | SEMI-CONVERSION | H | HEMATITE |
| ReS | RETURN SOLUTION | LR | LEACH RESIDUE |
| RS | RAW SOLUTION | ▨▨▨ | SOLID PHASE |
| $Q_1$, $Q_2$ | ENERGY FLOWS | —— | SOLUTION PHASE |

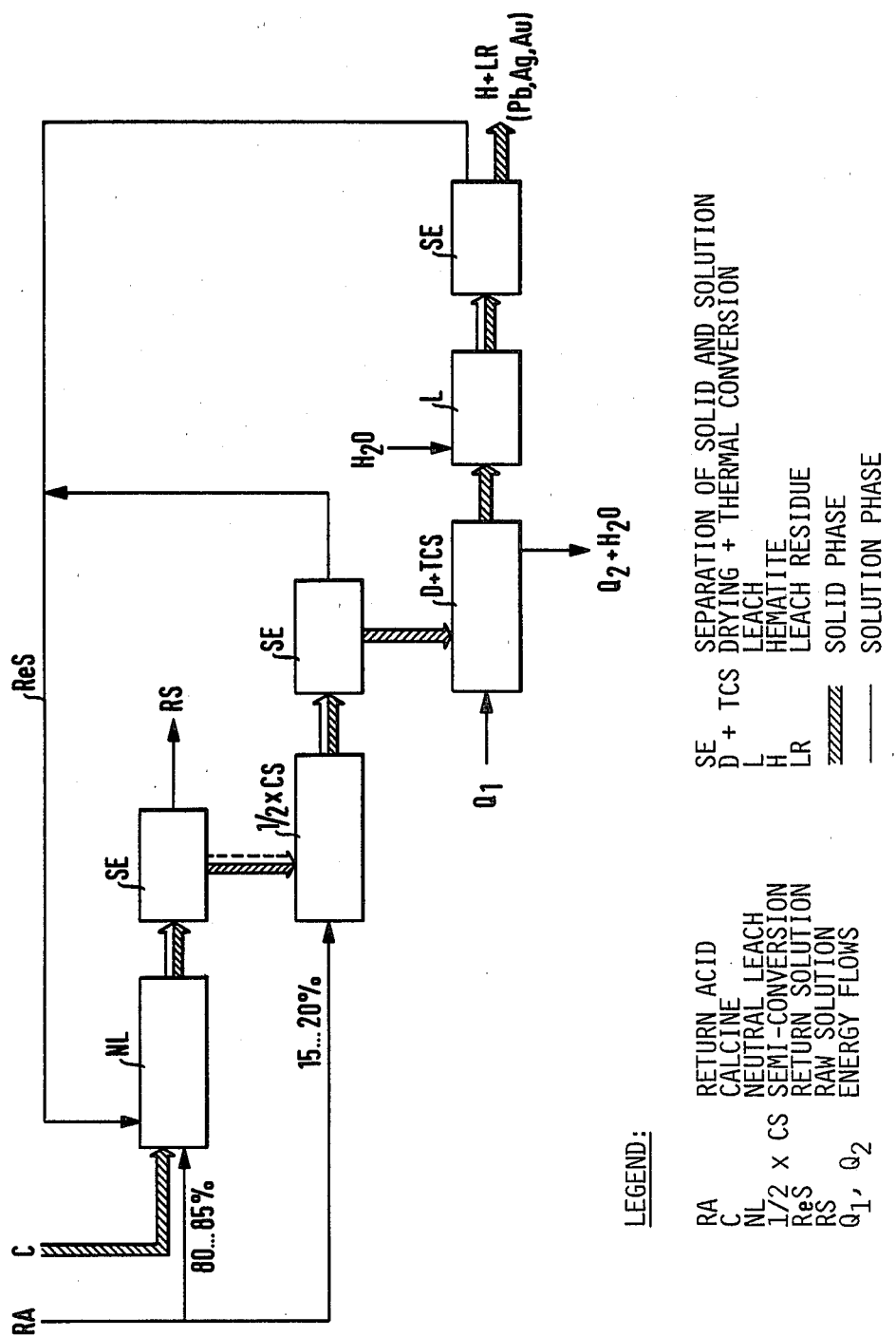

4,355,005

PROCESS FOR THE TREATMENT OF A RAW MATERIAL WHICH CONTAINS OXIDE AND FERRITE OF ZINC, COPPER AND CADMIUM

BACKGROUND OF THE INVENTION

The present invention relates to a process by which the zinc-ferrite-bearing leach residue regularly appearing in connection with an electrolytic zinc process is treated so as to bring the valuable metals zinc, copper, cadmium, lead, silver and gold present in it to a form in which they can be recovered economically.

The starting material of an electrolytic zinc process is a sulfidic zinc concentrate, from which an oxidic product, zinc calcine, is obtained by roasting. This calcine contains, in addition to the principal constituent, zinc oxide, practically all of the iron of the original concentrate, combined with zinc as zinc ferrite. The iron content in the concentrate usually varies between 5 and 15%, depending on the concentrate. An iron content of about 10% in the concentrate represents a typical value of currently used raw materials. This means that about 10% of the zinc of the concentrate is bound in zinc ferrite, $ZnFe_2O_4$, the content of which in this typical case is 21.5% of the total amount of calcine.

In addition to zinc, the zinc concentrate also contains other valuable metals such as Cu, Cd, Pb, Ag and Au, and the recovery of these metals is of considerable significance for the total economy of the zinc process. However, in planning a zinc process or in modifying a process, it is necessary to take into account the behavior of several elements present in the concentrate in the process. Some of these elements (Zn, S, Cu, Cd, Pb, Ag, Au) are of primary importance for the economy of the zinc process, whereas others (Fe, Co, Ni, Ge, Tl, In, Ga, Mg, Mn, Cl, F) have less or no economic importance but have to be taken into account precisely, with regard to the functioning of the process. In addition there are elements which are significant in terms of environmental protection (S, Hg, Se), the quality of the byproducts (Hg, Se, As, Sb, Sn), or waste formation (Fe, Si, Al, Ca).

It is of primary importance for the economy of the process that the recovery of zinc is high. In a process alternative which can be considered good at present, the target set for the recovery of zinc must be at minimum 97-98%, and also there must be a maximally good recovery of the above-mentioned valuable elements in a saleable form.

The following approximate values can be taken as average valuable-metal contents in a typical zinc concentrate: Zn 53%, Cu 0.5%, Cd 0.2%, Pb 1%, Ag 60 g/t, Au 0.5 g/t. This means that, at the current prices of the products, the total value content of copper and cadmium jointly is 4-5%, that of lead, silver and gold 8-10%, and, futhermore, the value of sulfur calculated as sulfuric acid 5-6%; i.e. the value content of the by-products is approximately 20% of the value of zinc, which is the principal product of the process. Thus it is evident that a maximal recovery of the said byproducts is also essential for a competitive process.

As regards the said harmful elements, especially iron, its recovery does not have special economic importance (the value of the iron as iron ore is about 0.2% of the value of the zinc); instead, the iron compounds formed during the process often cause a waste problem difficult to solve.

Prior to 1965, it was common in an electrolytic zinc process to recover the zinc present primarily as zinc oxide and zinc sulfate by means of a dilute acid leach, whereas the undissolved ferritic material constituted a leach residue, which in several cases was directed to waste disposal areas. In such cases, zinc, copper and cadmium bound in the ferrite, as well as lead, silver and gold which remained in the form of insoluble compounds under the leaching conditions, were also lost in the waste disposal area along with the iron detrimental to the process. At that time, the degrees of recovery of the metals were typically 87-89% for zinc, approx. 50% for copper, 50-60% for cadmium, and 0% for lead, silver and gold. The amount of ferritic leach residue was on the average approximately one-third of the amount of calcine fed into the process. The said procedure was applied, since a suitable method was not known for the separation of the large iron amounts present in the calcine.

An essential improvement in this respect was provided by the patent applications filed in 1965 by Steintveit and by Haigh & Pickering (Norwegian Pat. No. 108047 and Australian Pat. No. 401 724). In the processes disclosed in these patent applications, the ferrites were leached and the iron was precipitated in the form of a well-settling and filtrable jarosite compound. In the former process, the iron was precipitated under atmospheric conditions by using the zinc oxide of the zinc calcine for the neutralization of the sulfuric acid produced during the precipitation. In the latter process, the iron was precipitated in an autoclave, without neutralization. The jarosite process as a process in accordance with the former patent, supplemented with an acid wash of the jarosite precipitate (Norwegian Pat. No. 123 248), has found extensive use in the zinc industry. The process is described, for example, in G. Steintveit's article "Die Eisenfällung als Jarosit und ihre Anwendung in der Nassmetallurgie des Zinks", Erzmetall 23 (1970) 532-539.

In the jarosite process, the yield of zinc rises to 97-98%, the yield of cadmium to 90-95%, the yield of copper to 80-90%, and the yields of lead, silver and gold to 70-80%. A jarosite precipitate, the iron content of which is approximately 30% and amount somewhat less than 30% of the amount of calcine fed into the process, is removed from the process. The precipitate often—especially owing to its high annual output—constitutes a waste problem for the industrial establishment concerned. A leach residue which contains most of the lead, silver and gold of the concentrate is removed from the leaching stage of the process. The amount of the leach residue is usually approximately 5% of the amount of the calcine feed. The lead content in the residue is usually approximately 20%. The low lead content of such a leach residue and its oxidic and sulfatic composition have lowered its commercial value, and therefore it is understandable why earlier, at a time of a relatively low price level of lead and noble metals, it did not offer an especially interesting material for processing and was in many cases directed to the waste disposal area together with the jarosite precipitate.

Soon after the emergence of the jarosite process, Société de la Vieille Montagne developed the goethite process (Belgian Pat. No. 724 214). It differs from the jarosite process as regards the iron reduction stage ($Fe^{3+} \rightarrow Fe^{2+}$) and the iron precipitation stage. The iron is precipitated as goethite by using the zinc oxide of the zinc calcine for the neutralization of the sulfuric acid produced during the precipitation.

The metal yields of the goethite process are in the main the same as those of the jarosite process. The iron precipitate and the leach residue are removed from the process. The latter is similar to the leach residue of the jarosite process in both quality and quantity. The iron precipitate is in this case goethite-based, and its iron content is approximately 45–48%. Its amount is clearly less than that of the corresponding precipitate in the jarosite process, but even in this case it is nearly 20% of the amount of the zinc calcine feed. The goethite process has been described in the article by J. N. Andre and N. J. J. Masson "the Goethite Process in Retreating Zinc Leaching Residues", AIME Annual Meeting, Chicago, February 1973.

As is evident from the above brief descriptions of the processes both the jarosite and the goethite process produce relatively large amounts of iron precipitate, which is not suitable for, for example, the production of crude iron without further treatment, and for which no other use has been found, but the precipitates have as a rule been directed to waste disposal areas.

The attempt to diminish the waste problem has lead to a search for process alternatives in which the iron can be separated in the form of sufficiently pure hematite with the purpose of channeling it to the iron industry as raw material. On this basis, there has been developed the hematite processes, in which the iron is precipitated as hematite out from the process solution during an autoclave stage. The first hematite process was developed by The Dowa Mining Company, and the process is in use at a zinc plant in Iijima, Japan. The process has been described in the article by S. Tsunoda, J. Maeshiro, E. Emi, K. Sekine "The Construction and Operation of the Iijima Electrolytic Zinc Plant", TMS Paper Selection AIME A-73-65 (1973).

Another hematite process was recently developed by Ruhr-Zink GmbH in the Federal Republic of Germany. The process has been described in DT-OS No. 26 24 657 and DT-OS No. 26 24 658 and in the article by A. von Röpenack "Die Bedeutung der Eisenfällung für die hydrometallurgische Zinkgewinning", Erzmetall Bd 32 (1979) 272-276.

Outokumpu Oy has developed a process based on the utilization of jarosite compounds, i.e. the conversion process, in which special attention has been paid to a high recovery of zinc, copper and cadmium and to the simplification of the process for leaching the zinc calcine. The process has been in use at the Kokkola zinc plant of Outokumpu Oy since 1973. At the time that the process was adopted, the raw material of the plant was so low in lead, silver and gold that the recovery of these elements did not seem economically advisable at the then prevailing relative prices. On the other hand, it was viewed as advisable to aim at a maximally high recovery of the zinc, copper and cadmium present in the concentrate and at simplicity of the apparatus and the processing method. It was proven that by giving up the individual separation of the leach residue which contained lead and noble metals, normally carried out in connection with the previously described jarosite process, it was possible to combine the stages normally included in the jarosite process—ferrite leach, (preneutralization), jarosite precipitation and acid wash of jarosite precipitate—to form one stage in which the ferrite dissolves (consuming acid) and the iron simultaneously precipitates as jarosite (producing acid) and thereby to simplify the process of leaching zinc calcine. In this case the reactions (1) and (2) representing the phenomena occurring in the process (1) $3ZnFe_2O_{4(s)} + 12H_2SO_{4(aq)} \rightleftharpoons 3ZnSO_{4(aq)} + 3Fe_2(SO_4)_{3(aq)} + 12H_2O_{(aq)}$ (2) $3Fe_2(SO_4)_{3(aq)} + A_2SO_{4(aq)} + 12H_2O_{(aq)} \rightleftharpoons 2A[Fe_3(SO_4)_2(OH)]_{(s)} 6H_2SO_{4(aq)}$ (3) $3ZnFe_2O_{4(s)} + 6H_2SO_{4(aq)} + A_2SO_{4(aq)} \rightleftharpoons 2A[Fe_3(SO_4)_2(OH)_6]_{(s)} + 3ZnSO_{4(aq)}$ (A = Na, K)

are in mutual interaction and form a sum reaction (3), in which the zinc of the zinc ferrite passes into the solution and the iron is converted during the same stage via the solution to the jarosite phase. The leach yields and total yields of zinc are respectively 98–99% and 97.5–98.5%, and the total yields of copper and cadmium are 85–90%. The process is described in Finnish Patent Application 410/73 and in the articles by T-L. Huggare, S. Fugleberg, J. Rastas "How Outokumpu Conversion process raises Zinc recovery", World Min. (1974) 36–42 and by J. Rastas, S. Fugleberg, L-G. Björkqvist, R-L. Gisler "Kinetik der Ferritlaugung und Jarositfällung" Erzmetall Bd. 32 (1979) 117–125.

On the one hand, the raw material range having come to contain more lead, silver and gold than previously, and on the other hand, the changes in the relative prices of these metals—especially those of the noble metals—nowadays make it necessary to plan the leach process of the zinc calcine so that, in addition to a high recovery of zinc, copper and cadmium, a corresponding recovery is achieved also regarding lead, silver and gold.

In the jarosite and goethite processes summarized above, there is produced during a hot acid leaching stage a leach residue which no longer contains ferrites but contains all of the lead, silver and gold contained in the calcine fed to the neutral leaching stage. The lead content of this leach residue is in general relatively low, often about 20%. The low lead content of the residue and its oxidic and sulfatic composition decrease its commercial value. Therefore, it is understandable that processes by which the lead, silver and gold present in the residue can be obtained in a more saleable form have been developed for the further treatment of this leach residue—originally intended for sale.

Such processes have been introduced by Asturiana De Zinc S. A. in their Finnish Patent Application Nos. 3435/70 and 214/74 and by Société des Mines et Fonderies de la Vieille Montagne in their Finnish Patent Application No. 761582.

An examination of the jarosite, goethite and hematite processes briefly described previously shows that they are all relatively complicated multiple-stage processes. Each of them includes a hot acid leach of the neutral leach residue—in some processes it is carried out in a reducing milieu—producing a leach residue which contains the lead, silver and gold of the calcine fed to the neutral leach stage. As stated above, in order to raise the commercial value of this residue, there have been developed methods by means of which the lead, silver and gold present in the residue can be brought to a form more saleable than previously. Linking such processes to the original processes, however, makes their previously complex structure even more complex. It has proven to be necessary to seek new alternatives which would lead to implementation simpler than the previous ones in total processes.

Finnish Patent Application No. 803096 discloses an alternative process for the recovery of lead, silver and gold in connection with the process for leaching zinc calcine, the basic process being carried out in accordance with the method disclosed in Finnish Patent Application No. 410/73. The valuable materials present in the calcine, zinc, copper, cadmium, lead, silver and gold, can thereby be recovered by means of a relatively simple total process. It must be noted, however, that even in this alternative the iron emerging from the process is removed in the form of a jarosite compound. So far, no suitable use has been found for the jarosite compound, and so it must normally be transported to waste disposal areas. On the other hand, the jarosite compound—being a mineral also present in nature—is no problem waste in terms of environmental protection, provided that the industry concerned has enough land area suitable for waste disposal. However, in many cases it is considered an advantage if the iron emerging from the process can be brought to a hematite form, since it is easier to find suitable further uses for hematite than for jarosite.

Finnish Pat. No. 47907 discloses a process for the refining of residues which contain alkalic sulfates and hydroxide of iron and zinc ferrite and are formed in electrolytic zinc processes, to produce a raw material suitable for iron production and to recover the zinc present in the residues. The process is characterized in that the alkali-bearing precipitate which contains alkalic sulfates of iron and zinc ferrite is treated thermally in such a manner that the partial pressures of oxygen and sulfur and the temperature in the system Zn-Fe-S-O are adjusted to the thermal stability range of $ZnSO_4 + Fe_2O_3$, whereby the zinc and certain other non-ferrous metals are converted to water-soluble sulfates and the iron contained in the alkalic sulfates and ferrites of the precipitate is obtained in the form of oxide, the product obtained from this thermal treatment is leached, and the obtained solution is separated from the undissolved oxidic precipitate.

Also known is the process disclosed in Finnish Patent Application No. 791684, and by taking this process into account a maximal sulfating of the zinc bound in zinc ferrite is achieved. The essential advantage of this process over the process according to Finnish Pat. No. 47907 is that, by operating within the thermal stability range of the system $Fe_2O_3/Fe_2(SO_4)_3$, all of the $Fe_2(SO_4)_3$ contained in the mixture can be used for the sulfating of the desired material, i.e. in this case zinc ferrite, without unnecessarily decomposing it to hematite, in which the operating conditions used in Finnish Pat. No. 47907 result. An additional advantage thereby gained is not only a need for smaller amounts of reagents but also easier control of the process, since the re-forming of ferrites at high temperatures, described in Finnish Pat. No. 47907, is totally avoided, even for thermodynamic reasons. However, when the process according to Finnish Patent Application No. 791684 is used, the final product is hematite, but not hematite produced through thermal decomposition of $Fe_2(SO_4)_3$ but advantageously hematite formed through reaction (4) $3ZnFe_2O_4 + Fe_2(SO_4)_3 \rightarrow 3ZnSO_4 + 4Fe_2O_3$ as described in greater detail in Finnish Patent Application 791684. In this case, the sulfating takes place to completion and as advantageously as possible, but its prerequisites include correct thermodynamic operating conditions.

The object of the present invention is to eliminate the disadvantages of the above-mentioned known processes and to provide a process for treating zinc calcine, a process by which the iron is recovered in hematite form. The hematite precipitate contains the lead, silver and gold of the zinc concentrate in such a form that their recovery can be carried out by the chloride leaching method known per se, or advantageously by the sulfidization and froth-flotation process according to Finnish Patent Application No. 803096.

SUMMARY OF THE INVENTION

According to the present invention the above objects are achieved by adding a solution containing sulfuric acid or ferrisulfate or both to the ferrite-bearing residue in such an amount that approximately 50–60% of the ferrite dissolves and its iron precipitates as jarosite, the solid phase is dried and heated to so high a temperature that the zinc of the solid phase is converted to zinc sulfate and its iron to hematite according to the following reaction:

(8) 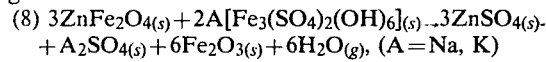 $3ZnSO_{4(s)} + A_2SO_{4(s)} + 6Fe_2O_{3(s)} + 6H_2O_{(g)}$, (A = Na, K)

and finally the thus treated solid phase is slurried in water in order to leach the sulfates and to separate them from hematite.

DESCRIPTION OF THE DRAWING

The FIGURE illustrates diagrammatically the treatment system for zinc calcine according to the invention.

DESCRIPTION OF THE PREFERRED EMBODIMENT

In the embodiment of the FIGURE, the entire calcine feed is directed to a neutral leach stage (NL). The neutral leach can be carried out in one or two stages (Finnish Patent Application Nos. 410/73 and 760486), and the two-stage process, for its part, can be carried out either countercurrently or cocurrently (Finnish Patent Application No. 410/73). From the separation stage for solid and solution (preferably thickening) connected with the neutral leach, the solution (raw solution) is directed to solution purification and the ferritic leach residue is directed to a semi-conversion stage ($\frac{1}{2} \times CS$). To this stage there is also fed a return acid amount (or ferrisulfate amount) which is, first, equivalent with regard to the zinc ferrite fed to the stage in accordance with Reaction (5 or 5a)

(5) $6ZnFe_2O_{4(s)} + A_2SO_{4(aq)} + 6H_2SO_{4(aq)} \rightarrow 3ZnSO_{4(aq)} + 3ZnFe_2O_{4(s)} + 2A[Fe_3SO_4)_2(OH)_6]_{(s)}$ (5a) 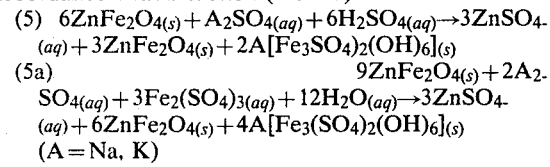
$(aq) + 6ZnFe_2O_{4(s)} + 4A[Fe_3(SO_4)_2(OH)_6]_{(s)}$ (A = Na, K)

and, second, adjusts the concentration of sulfuric acid in the solution at the end of the stage to between 20 and 40 kg/m³ [in connection with Reaction 5a, through the reaction 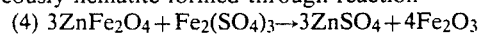 $+ A_2SO_{4(aq)} + 12H_2O_{aq} \rightarrow 2A[Fe_3(SO_4)_2(OH)_6]_{(s)} + 6H_2SO_{4(aq)}$]. During this stage, the most finely divided fraction of the zinc ferrite reacts rapidly and Reaction (5 or 5a) can be caused to occur in a relatively small reactor volume. This is evident from the laws governing the dissolving of zinc ferrite and the precipitation of jarosite disclosed in the article by J. Rastas, S. Fugleberg, L-G. Björkqvist, R-L. Gisler "Kinetik der Ferritlangung und Jarositfällung", Erzmetall Bd. 32 (1979) 117–125 and if it is taken into account that only about 15–20% of the total amount of return acid fed into the process is directed to the semi-conversion stage and most of it, 80–85%, is directed to the neutral leach stage. The sodium sulfate included in Reaction Equation (5) cycles along with the process solution, and it combines with the jarosite compound during the semi-conversion stage and is re-released into the solution at a later stage of the process, i.e. the leaching stage (L) for the thermally treated solid phase. From the separation stage (thickening and filtration) connected with the semi-conversion, the solution is directed to the neutral leach and the filter dry solid phase is directed to drying and thermal conversion (D+TCS). The filter dry solid phase, a mixture of ferrite and jarosite, is best dried by means of a steam drier, making sure that the utilization and recovery of energy at that time is as effective as possible. The dried solid phase is directed to thermal treatment, and the reactions occuring during this treatment can be divided into two parts: Reaction (6)

(6) $2A[Fe_3(SO_4)_2(OH)_6]_{(s)} \rightarrow 2AFe(SO_4)_{2(s)} + 2Fe_2O_{3(s)} + 6H_2O_{(g)}$, the thermal decomposition of jarosite, which occurs within a temperature range of 400°–500° C. and during which a binary sulfate, $AFe(SO_4)_2$ is formed, and Reaction (7)

(7) $3ZnFe_2O_{4(s)} + 2AFe(SO_4)_{2(s)} \rightarrow 3ZnSO_{4(s)} + A_2SO_{4(s)} + 4Fe_2O_{3(s)}$, the actual sulfating reaction of zinc ferrite, which occurs within a temperature range of 600°–680° C. Equation (7) now corresponds to Reaction (4) given previously, the starting material of the reaction mixture being Na-jarosite. Thus, in this case $NaSO_4$ cycles in the system without participating in the actual sulfating reaction, but acting as a creator of the smelting conditions essential for the thermal reaction, as described in greater detail in Finnish Patent Application No. 791684.

The net reaction of Reactions (6) and (7) is (8) $3ZnFe_2O_{4(s)} + 2A[Fe_3(SO_4)_2(OH)_6]_{(s)} \rightarrow 3ZnSO_{4(s)} + A_2SO_{4(s)} + 6Fe_2O_{3(s)} + 6H_2O_{(g)}$ (A = Na, K)

The thermally treated solid phase is cooled and slurried in water, whereby the zinc sulfate and sodium sulfate phases of the solid phase dissolve (9) $3ZnSO_{4(s)} + aq \rightarrow 3ZnSO_{4(aq)}$

(10) $ASO_{4(s)} + aq \rightarrow A_2SO_{4(aq)}$.

The gases from the thermal conversion can also be cooled by means of the process solutions, whereby the water vapor of Reaction (6) (or 8) condenses

(11) $6H_2O_{(g)} + aq \rightarrow 6H_2O_{(aq)}$.

In terms of energy economy it is also advantageous to control the process in such a manner that the water vapor contained in the drying gases is condensed and the energy thereby released is used for heating the process solutions.

The net reaction occurring in total during the stages ½×CS, CS+TCS, and L, is the one obtained by adding together Reactions (5), (8), (9), (10) and (11):

(12) $6ZnFe_2O_{4(s)} + 6H_2SO_{4(aq)} \rightarrow 6ZnSO_{4(aq)} + 6Fe_2O_{3(s)} + 6H_2O_{(aq)}$ i.e. the same net reaction as is also the net reaction occurring during stages ½×CS and CS-H-A in the process disclosed in Finnish Patent Application No. 803097. In it, the reaction in question is achieved hydrothermally, in which case the net reaction of the reactions (8)–(11) of the present paper (Reaction (6) in the patent application referred to) occurs in an autoclave within a temperature range of 220°–250° C.

The same as in Finnish Patent Application No. 803097, the jarosite appearing in Reaction Equation (8) of the process according to the present invention can be a previously formed jarosite which has been transported to a waste disposal area. In this case also, the zinc ferrite of the ferritic leach residue from the neutral leach stage and the jarosite of the jarosite precipitate taken from a waste disposal area are proportioned so that the amount of jarosite is sufficient, and somewhat (10–30%) overproportioned, with regard to the amount of zinc ferrite according to Reaction (7). Therefore, in this procedure the semi-conversion (½×CS) stage and the separation stage connected with it are not necessary. The ferritic leach residue taken from the neutral leach stage is separated from the solution phase by means of thickening and filtering. In this process alternative it is—the same as in the analogous case disclosed in Finnish Patent Application 80 3096—necessary to remove the excess sulfate of the process by some sulfate removal method known per se and used in conjunction with a zinc process.

When zinc calcine is treated by the process according to the present invention, the lead, silver and gold contained in the zinc calcine—and in the case last described, also in the jarosite precipitate—pass in their entirety into the hematite precipitate emerging from the process. In the precipitate, the lead is in the form of lead sulfate and the silver is partly in the form of chloride and partly in the form of sulfide. The lead, silver and gold can be recovered from the hematite precipitate either by the chloride leaching process known per se or advantageously by the sulfidization and froth-flotation process disclosed in Finnish Patent Application No. 803096.

By the process according to the present invention it is possible to recover very economically the valuable elements of the zinc calcine, i.e. zinc, copper, cadmium, lead, silver and gold.

The process according to the invention and the results achieved by it are described in the following examples.

EXAMPLE 1

The solid phase separated after the semi-conversion stage (½×CS) was dried and fed into a revolving laboratory furnace with indirect heating of the reacting feed mixture. The feed mixture consisted of a ferritic leach residue which had reacted during the semi-conversion stage, and it contained zinc ferrite, Na-jarosite, and secondary components, present in the leach residue, which were insoluble or which had converted to an insoluble form during the said process conditions. The analysis of the feed mixture was as follows: Zn 8.6%, Fe 36.8%, Na 2.1%, S 8.0%, $SiO_2$ 1.7%, Pb 4.0%, Ag 110 g/t, Au 1.6 g/t. The temperature of the reaction mixture in the furnace was 650° C. and its retention time 1 h. The water-soluble iron of the thermally treated solid was 0.8% and its water-insoluble zinc was 0.43%. The thermally treated solid was slurried in water, the hematite-based solid was separated from the solution and washed. The analysis of the washed and dried hematite-based solid was as follows: Fe 54.6%, Zn 0.59%, $SiO_2$ 2.2%, Pb 5.6%, Ag 265 g/t, Au 2.2 g/t.

EXAMPLE 2

The feed mixture fed into the laboratory revolving furnace had been obtained by mixing a ferritic leach residue with jarosite precipitate obtained from a waste disposal area and by drying the mixture. The analysis of the ferritic leach residue, the jarosite precipitate and the mixture were as follows (all calculated in dried form):

| Name | Mass g | Zn % | Fe % | Na % | S % | SiO$_2$ % | Ca % | Pb % | Ag g/t | Au g/t |
|---|---|---|---|---|---|---|---|---|---|---|
| Ferritic leach residue | 1000 | 21.2 | 41.2 | | 0.9 | 2.0 | | 4.4 | 190 | 1.6 |
| Jarosite | 1750 | 1.7 | 28.0 | 2.7 | 12.7 | 3.3 | 2.0 | 2.1 | 155 | 1.2 |
| Mixture | 2750 | 8.8 | 32.8 | 1.7 | 8.4 | 2.8 | 1.3 | 2.9 | 167 | 1.3 |

The mixture was kept in the tube furnace for 0.5 h at a temperature of 650° C. The water-soluble iron of the thermally treated solid was 1.4% and its water-insoluble zinc was 0.38%. The thermally treated solid was slurried in water, the hematite-based solid was separated from the solution and washed. The analysis of the washed and dried hematite-based solid was as follows: Fe 52.0%, Zn 0.6%, SiO$_2$ 4.5%, Ca 2.1%, Pb 4.7%, Ag 270 g/t and Au 2.0 g/t.

EXAMPLE 3

The feed mixture was prepared from a ferritic leach residue and a synthetic Na-jarosite. Two feed mixtures were prepared, in which the excess of Na-jarosite—in accordance with Reaction (7)—was 20% in Mixture I and 30% in Mixture II.

| Name | Na % | Zn % | Fe % | Pb % | S % | S$_s$ % |
|---|---|---|---|---|---|---|
| Na—jarosite | 3.1 | 0.03 | 34.0 | — | 11.8 | — |
| Ferritic leach residue | — | 21.8 | 41.5 | 4.7 | — | 0.06 |
| Mixture I | 1.8 | 8.9 | 37.1 | 1.9 | 7.0 | 0.02 |
| Mixture II | 1.9 | 8.4 | 36.9 | 1.8 | 7.3 | 0.02 |

Mixture I was kept in the tube furnace for 1 h and Mixture II for 2 h, at a temperature of 630° C. The following results were obtained from the experiments:

| Name | Water-soluble/% | | | | | water-insoluble/% | | | | S$_{total}$ % |
|---|---|---|---|---|---|---|---|---|---|---|
| | Zn | Fe | Na | Pb | SO$_4$ | Zn | Fe | Na | Pb | |
| Mixture I | 9.7 | 0.32 | 1.9 | 0.06 | 22.8 | 0.60 | 39.0 | 0.03 | 2.3 | 8.0 |
| Mixture II | 9.4 | 0.20 | 2.1 | 0.06 | 22.8 | 0.46 | 39.6 | 0.03 | 2.1 | 7.8 |

What is claimed is:

1. A process for the treatment of a raw material which contains oxides and ferrites of at least one element selected from the group comprising zinc, copper and cadmium, comprising neutral leaching the raw material with a sulfuric-acid-bearing solution in order to leach the oxides without substantially dissolving of the ferrites; a ferrite-bearing residue is separated; mixing a solution of sulfuric acid or ferrisulfate or both with the residue in order to leach the ferrite and to precipitate the iron as jarosite in the presence of alkali ions or ammonium ions under atmospheric conditions at 80°–105° C., the sulfuric acid or ferrisulfate solution being added to the ferrite-bearing residue in such an amount that approximately 50–60% of the ferrite dissolves and its iron precipitates as jarosite; drying the solid phase and heating it to a temperature high enough to convert the zinc of the solid phase to zinc sulfate and its iron to hematite according to the following reaction:

(8)  $3ZnFe_2O_{4(s)} + 2A[Fe_3(SO_4)_2(OH)_6]_{(s)} \rightarrow 3ZnSO_{4(s)} + A_2SO_{4(s)} + 6Fe_2O_{3(s)} + 6H_2O_{(g)}$, (A = Na, K)

and finally slurrying the so treated solid phase in water in order to leach the sulfates and separate them from hematite.

2. The process of claim 1, comprising treating the solid phase at 600°–680° C.

3. The process of claim 1 or 2, comprising mixing so much sulfuric acid or ferrisulfate solution with the ferrite-bearing residue that the concentration of sulfuric acid in the solution at the termination of this stage is approximately 20–40 kg/m$^3$.

* * * * *